United States Patent [19]

Howells et al.

[11] 3,799,293
[45] Mar. 26, 1974

[54] EMERGENCY-STOP BRAKE
[75] Inventors: Paul W. Howells, Morrisville; Edwin H. Lederer, Syracuse, both of N.Y.
[73] Assignee: Syracuse University Research Corporation, Syracuse, N.Y.
[22] Filed: Dec. 18, 1972
[21] Appl. No.: 316,357

[52] U.S. Cl. .................................................. 188/5
[51] Int. Cl. ............................................. B60t 1/14
[58] Field of Search ........................ 188/5; 180/115

[56] References Cited
UNITED STATES PATENTS
3,116,897  1/1964  Theed ............................... 188/5 X
3,659,678  5/1972  Hall ..................................... 188/5
FOREIGN PATENTS OR APPLICATIONS
1,159,866  2/1958  France .................................. 188/5
   23,640  8/1907  Great Britain ........................ 188/5

Primary Examiner—Duane A. Reger
Attorney, Agent, or Firm—Bruns & Jenney

[57]  ABSTRACT
A vehicle brake for emergency stops comprises a pad suspended back of the rear wheels by an arm at each side extending forward to a pivotal connection to the main frame member, each arm having an offset portion for clearing the rear axle when the pad is dropped. The pad is normally held elevated by a linkage including explosive bolts between the frame and arm at eadh side, the arms being biased downward by spring means. The pad includes a metal housing to which is secured reinforced tire tread rubber sections for contact with the rotary interspersed with air passages leading to a chamber quickly exhaustible by a jet-pump. A partial torus around the edge of the housing has secured therein an inflated rubber ring for sealed contact with the roadway. Supported ahead of the pad is a plow and a squeegee for clearing the roadway. Deployment of the brake is initiated by panic pressure on the brake pedal exceeding the normal lock-up brake pressure, the pedal including shear pin means for disabling the normal vehicle brakes and switch means connected to the vehicle electrical system for exploding the linkage bolts and for firing the explosive jet pump. The pad chamber includes a spring-biased vacuum spoiler valve actuated by deceleration force to limit deceleration to a selected rate.

3 Claims, 7 Drawing Figures

PATENTED MAR 26 1974 3,799,293
SHEET 1 OF 2
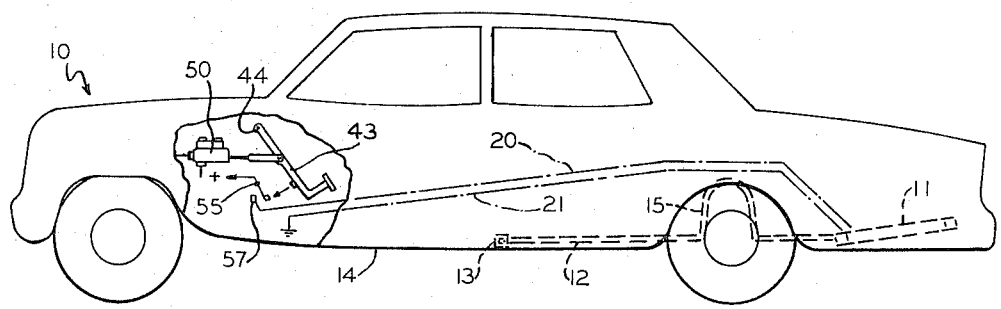
Fig. 1
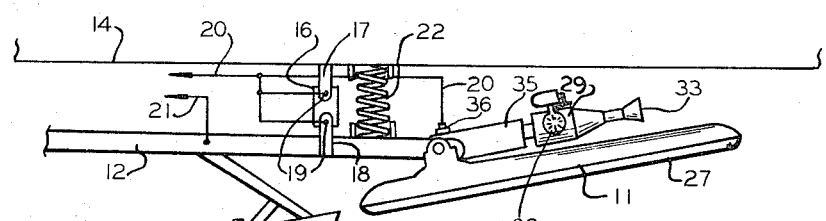
Fig. 2
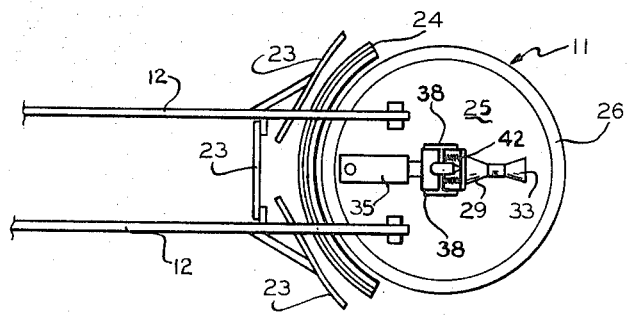
Fig. 3
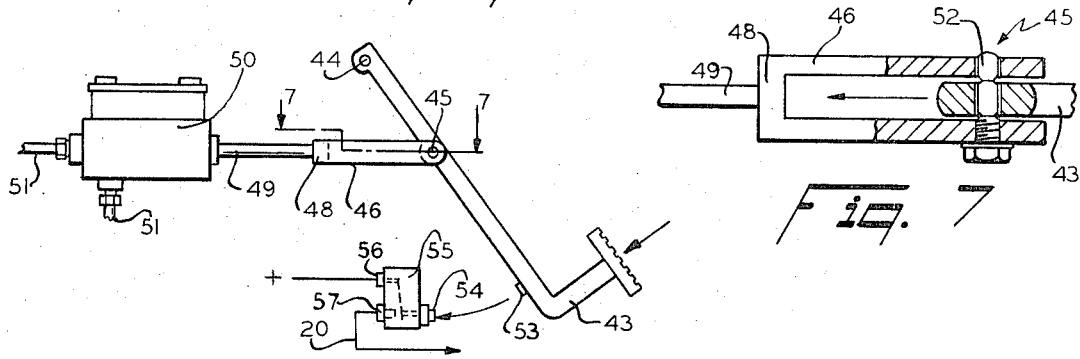
Fig. 6
Fig. 7

EMERGENCY-STOP BRAKE

BACKGROUND OF THE INVENTION

This invention relates to a vehicle brake system having a ground-engaging pad connected to the vehicle frame and adapted to engage the ground trailing the rear wheels when the conventional brake pedal is depressed with more than normal force, the pedal disabling the conventional brakes at the same time. Suction is employed to hold the pad in contact with the pavement and pavement clearing means precede the pad.

Brake systems with ground-engaging members have heretofore been known and suction has been provided for ground-engaging members to hold a vehicle to the road or a helicopter to the ground or other vehicle to a ship's deck. None of such known systems or devices, however, provide braking means efficient enough to quickly stop modern vehicles proceeding along our high-speed highways and freeways in case an emergency situation arises. Moreover, known braking systems do not provide steering control when panic braking results in a skid due to locking the brakes so that the wheels skid along the road.

SUMMARY OF THE INVENTION

The present invention contemplates an emergency-braking pad which can substantially instantaneously be lowered to the road and be held against the road surface by atmospheric pressure for decelerating the vehicle without altering the other normal pressures on the vehicle. To avoid any tendency of such a fast acting and efficient brake to cause swerving of the vehicle, the pad is normally carried at the rear of the vehicle behind the rear wheels in raised position, for example, under the luggage compartment of the conventional passenger car. The pad is functionally connected to the vehicle body on each side by an arm extending forward to a hinged connection with a frame side member, the arms being long enough to allow the pad to fall and contact the ground.

Means for carrying the pad normally raised is a linkage between connecting arm and body frame including quick release fasteners such as explosive bolt connections, preferably more than one for fail-safe reasons. The explosive bolts are of the type which can be electrically fired. Spring means under compression are provided to impel the pad downward when the bolts are fired.

The pad has a metal housing to which is secured one or more tread rubber contact members having a flat surface adapted to contact the pavement. The housing is bordered by a partial toric border in which is secured an inflatable rubber seal for contact with the road surface and the contact members have air passages therebetween connected to a suction chamber. The chamber has quick acting jet-pump means for evacuating air by suction or entrainment from within the housing. It will be understood that "jet-pump" used herein includes those fast-acting pumps whose pumping action is caused by the rapid release of gas from a liquid gas container or from burning rocket fuel. In either case the pumping is initiated electrically, either by opening an electrically operated valve or by electrically igniting a squib.

Attached to the pad-support-arm assembly so as to precede the pad are plow means and then squeegee means. The plow clears the path of the pad of rubble or snow and ice in the roadway and the squeegee clears the path of excess water.

Initiation of the emergency brake system is by panic braking of the vehicle's conventional brake system. Most drivers become accustomed to using a vehicle's brakes only to the extent necessary and short of locking the car wheels so that they skid and cause the car to swerve and run off the road. Panic-braking will be understood herein to mean exerting more pressure on the brake pedal than will ordinarily cause lock-up of the wheels.

The brake pedal of the emergency brake system has a connection to the operating mechanism of the conventional brakes of the vehicle which may be a lever connected to operate mechanical brakes or a link to the master cylinder of hydraulic brakes. Included in this connection from pedal to lever or link is one or more shear pins having a breaking point chosen to break the connection when the pedal is depressed with a selected force more than the lock-up force of the conventional brake system, twice the lock-up force for example. Panic-braking, or when this shear force is exceeded, disables the conventional brakes and allows the driver to continue steering the car. Poor drivers will soon learn not to exceed the lock-up force in ordinary braking since resetting and new parts will be required after use of the emergency brake as will hereinafter appear.

A switch, or two switches, connected to the vehicle electrical system is also provided operable by the brake pedal upon exceeding the shear pressure described above for substantially simultaneously electrically exploding the link bolts and initiating the pumping action of the jet pump or pumps. This simultaneous initiation of the emergency brake action is calculated to disable the vehicle brakes, release the pad to be impelled downward, and to initiate vacuum conditions in the pad housing so that emergency braking action is effective within a small fraction of a second of the panic-braking.

The conventional braking system of all modern automobiles is effective to produce deceleration at the rate of from 1/2G to almost 1G at high speeds. A braking pad with contact members 4 ft. in diameter has 12 square feet braking surface and with substantially atmospheric pressure holding the pad down produces a deceleration rate of more than the 2 to 3G which is acceptable to driver and passengers provided with adequate seat belts.

Perfect zero pressure within the pad housing cannot be obtained, of course, due to irregularities in the pavement but the jet-pump is capable of reducing the pressure to about 1.5 psi. Allowing a driver 1 sec. reaction time, at a speed of 70 mph, the car can be stopped thereafter in 160 to 190 feet within 2 to 3 seconds. The jet-pump, therefore, is required to be active for only 3 seconds. One pound of solid rocket fuel is sufficient to maintain such a jet-pump in operation for this time.

A mechanism is provided in the vacuum chamber of the pad to limit the deceleration rate at the desired 2 to 3G which is acceptable. A port is provided, normally closed by a valve biased toward sealed position by a spring selected to yield when the acceptable deceleration rate is exceeded. The valve is weighted and opens when affected by the excessive deceleration rate.

It will be noted that the suction created by the jet-pump results in substantially atmospheric pressure being applied to the contact member or members of the pad which supply the braking force. Minimal or no braking action is supplied by the seal and only deceleration forces are communicated to the vehicle.

BRIEF DESCRIPTION OF THE DRAWINGS

FIG. 1 is a diagrammatical side elevational view of an automobile having an emergency brake according to the invention in raised position, parts being broken away to show the brake deployment mechanism;

FIG. 2 is an enlarged side elevational view of a portion of the brake of FIG. 1 showing the means for holding the pad elevated and means for propelling it downward;

FIG. 3 is a plan view of the portions shown in FIG. 2;

FIG. 6 is an enlarged, fragmentary, diagrammatical, side elevational view of the brake deployment mechanism shown in FIG. 1; and FIG. 7 is an enlarged plan view of a portion of the mechanism of FIG. 6, a portion being shown in section on the line 7—7 of FIG. 6.

DESCRIPTION OF THE PREFERRED EMBODIMENTS

Figure 4:
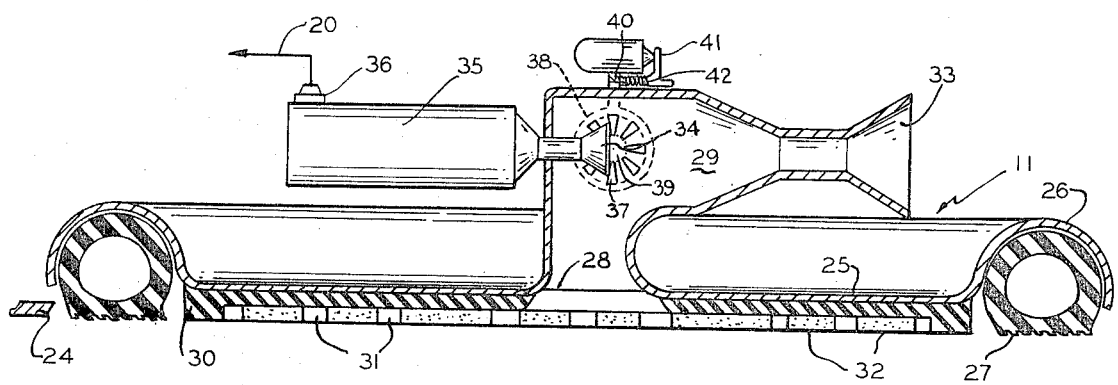
FIG. 4 is a diagrammatical sectional view on the line 4—4 of FIG. 5.

Referring to FIG. 1 an automobile 10 is provided with a brake pad 11 held elevated back of the rear wheels and connected by an arm 12 at each side extending forward to a pivotal connection 13 to a frame member 14. An offset portion 15 of each arm is provided for the car's axle when the pad is dropped.

Referring to FIG. 2, the arms 12 are held in elevated position by a link 16 between a pendant projection 17 from the frame side member 14 and an upstanding projection 18 from arm 12. Link 16 is connected to projections 17 and 18 by explosive bolts 19. Electrical wires 20 extend from each explosive bolt 19 forward as will be hereinafter described and a ground wire 21 may be provided. Wire 20 is also connected to pad 11 as will appear. A spring 22 compressed between arm 12 and frame 14 is provided for propelling arm 12 downward upon deployment of the brake.

Supported from the arms 12 are plow means, shown as articulated with three blade members 23 in FIG. 3. The blades 23 precede the pad 11 and each comprises a hardened steel blade with a sharp pointed lower edge. The blades are preferably slightly raked so as to dig into ice and snow on the roadway but not to a degree where they tend to dig into an asphalt pavement.

Following the blades 23 a squeegee assembly 24 is supported by the arms 12. Although not shown in detail in the drawings, the squeegee is preferably formed of strips of tread rubber material compressed to form a laminated whole with each strip angled upward and backward and suitably braced. Narrow vertical slots between the strip laminations, overlapping in coverage on alternate layers, provide an action whereby water on the pavement in front of pad 11 is gathered and flung upward while the reaction forces press the strips of the layers firmly against the pavement.

Referring now to FIG. 4, pad 11 has an inverted dish shaped sheet steel housing 25 formed with a semi-toric ring 26 around its border, open at the bottom. Secured in the ring 26 by adhesive or otherwise is an inflated rubber ring 27 like a bicycle tire for sealing engagement with the pavement. Ring 27 is inflated to about 15 psi so that, when deployed, it is flattened, as shown, and has a 2 to 3 inch contact with the road. Ring 27 may have road-contacting ridges therearound as shown.

Figure 5:
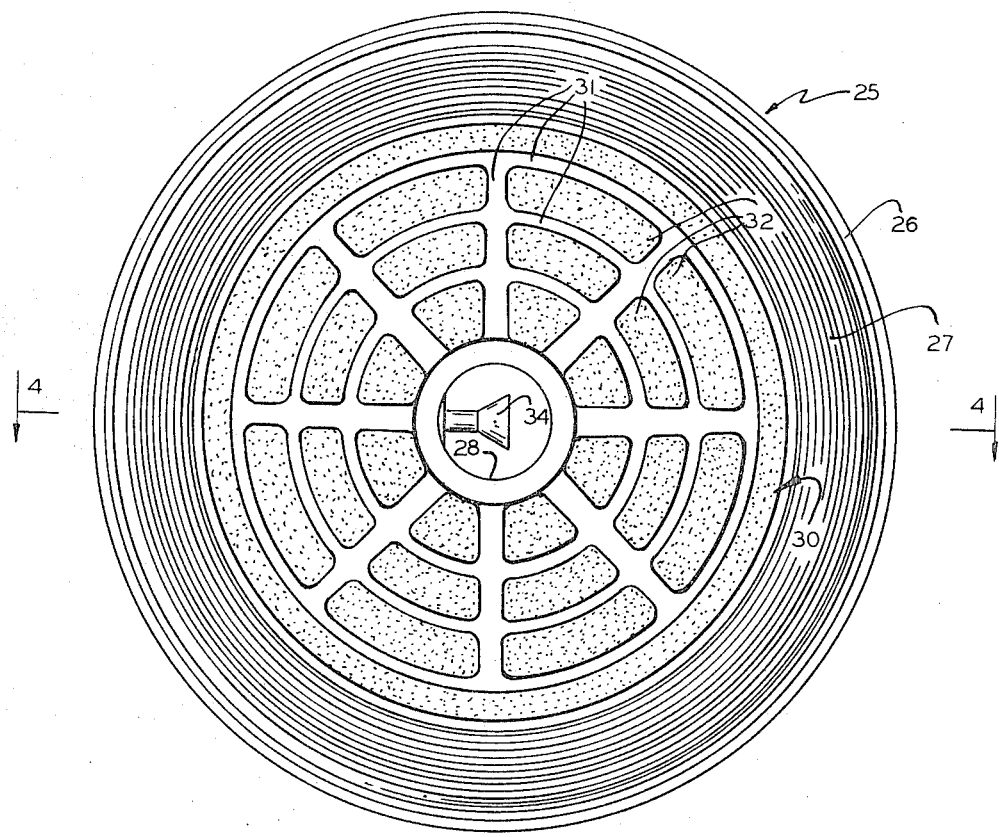
FIG. 5 is a bottom plan view of the pad shown in FIG. 4.

As best seen in FIG. 5, the housing 25 has a hole 28 at its center leading up to an exhaust vortex chamber 29 formed at the top of the housing. Around the hole 28 and within the toroidal border 26, a contact member 30 is secured by adhesive and rivets to its coverplate portion of housing 25. The contact member 30 is divided by air passages 31, as shown, into separate ground contacting portions 32. Portions 32 may be reinforced by metal studs, not shown.

The suction chamber 29 is provided with the usual rearwardly-extending, venturi type exhaust 33 and, at its forward end, with the exhaust or jet passage 34 of the jet pump motor 35, which is shown as a rocket fuel motor with an electrically ignitable squib 36. When the squib ignites the rocket fuel, the escaping gasses from jet 34 entrain air in the chamber 29 and carries the air with the combustion gasses from the exhaust 33. Air in passages 31 is thereby exhausted to lower pressure therein to about 1.5 psi. About 90 percent of atmospheric pressure therefore forces the housing 25 and its contact pad 30 against the pavement and substantially no force except deceleration forces are exerted on the vehicle.

Housing 25 has a degree of flexibility allowing it to conform to the normal irregularities of modern paved roadways.

To prevent the deceleration forces from becoming too great, vacuum spoiler ports 37 are provided opening at the sides of chamber 29 and the ports are normally closed by weighted slider valves 38. Valves 38 are rotatable about centers 39 to align openings therethrough with ports 37. Each valve 38 has a weighted arm 40 extending upward adapted to rock forward from its stop at 41 and springs 42 bias the arms toward the stopped position shown. The springs are selected to yield to deceleration forces on weighted arms 40 when they exceed the acceptable deceleration rate of about 2 G's.

Other jet-pump means may be used but the rocket fuel jet shown with exhaust facing rearward is preferred as the noise of ignition and flames to the rear serve as a warning to following drivers.

Referring now to FIG. 6, deployment mechanism for the emergency brake will now be described. The brake pedal 43, having a pivotal support at 44, has a pivotal connection at 45 with a deep throated clevis 46 operatively connected at 48 to the operating rod of the conventional braking system of the car 10, here shown as the piston rod 49 of the master cylinder 50, hydraulic lines 51—51 leading to the conventional brakes.

Referring to FIG. 7, connection between pedal 43 and clevis 46 is by a shear pin 52 which is chosen to break under a selected load exceeding the lock-up load of the conventional brake system. When the pin 52 breaks, pedal 43 is free to advance in the throat of clevis 46 and pressure is removed from rod 49 disabling the conventional brakes.

As pedal 43 advances upon breaking pin 52, a projection 53 on the pedal advances to strike an operating button 54 of a switch 55 secured to the floor board of the car 10. Although only one switch 55 is shown, it is apparent that two switches 55 may be provided for fail-safe reasons.

One contact 56 of switch 55 is electrically connected to the power source of the electrical system of car 10 indicated by the plus sign. Operation of button 54 closes the switch and contact 57 is energized. The latter contact is electrically connected to wire 20 shown in FIG. 2 and indicated in FIG. 1. Since wire 20 is connected to the explosive bolts at 19 and to the squib 36, the car brakes are disabled substantially simultaneously with the breakage of the linkage 16 to lower pad 11 and the firing of the jet-pump motor 35 to engage the pad 11 with the ground.

When the pad comes in contact with the pavement, the contact portions 32 engage the pavement and, since the jet-pump 35 is already ignited, air is exhausted from the passages 31. The sealing ring 27 also engages the pavement and is flattened, as described. Pad 11, therefore, is almost instantaneously forced against the pavement with a force approaching atmospheric pressure and the deceleration forces are communicated to vehicle 10 by the arms 12. The conventional brakes of the vehicle have been disabled so the driver can control the steering of the car.

Snow, ice, pebbles, or other obstructions in front of pad 11 are cleared away by the plow blades 23 and, if the roadway is wet, water is thrown upward and sideward by the squeegee 24.

If the rate of deceleration exceeds the chosen acceptable rate, the valve 38 is opened and the hold-down pressure on the pad 30 is lessened until the rate is again acceptable and the spoiler ports 37 are again closed. Since the stopping time required for a vehicle proceeding at high speeds rarely exceeds 3 seconds, the jet-pump 35 need only be active for that period of time. If the jet-pump is active after the vehicle has come to a stop, no harm is done as the pad 11 is merely held in suction contact with the ground for a short period after the vehicle stops.

It will be seen that, after coming to an emergency stop, shear pin 52 and explosive bolts 19 or other quick acting fasteners will have to be replaced and the pad 11 again raised to its elevated position. Also the fuel for the jet-pump 35 and the ignition squib 36 will have to be replaced. The pad 30, squeegee 24 and seal ring 27 also may have become worn and require replacing. Such refurbishment is necessary both to guarantee the subsequent safe operation of the brake and to identify drivers who habitually drive into panic-braking situations. Repair of the emergency brake may become a matter of public record.

We claim:

1. An emergency-stop brake for wheeled vehicles having conventional pedal-operated brakes, comprising: a pad having means normally suspending it under the vehicle, arms hingedly connecting the pad to the vehicle at each side and adapted to lower the pad in contact with the road rearward of the vehicle wheels, plow means and squeegee means being secured to the arms for preceding the pad when lowered for clearing the path of the pad, the pad having an inverted dish-shaped housing, an air seal member secured around the border of the pad and adapted to contact the road, flat-bottomed road-contacting members secured within the housing, air passages between the contacting members, an exhaust chamber secured to the housing, the air passages being connected to the chamber, jet-pump means operatively connected to the chamber for quickly exhausting air from the air passages, electrical means for initiating pumping action of the pump means, the pad suspending means having link means including electrically actuated quick release fasteners connecting the arms to the vehicle, the pad being normally spring-biased downward, the brake pedal being connected to the conventional brakes by means including shear-pin means adapted to disable the conventional brakes when the brake pedal is depressed by a panic-braking force exceeding the wheel locking force adapted to lock the conventional brakes, and switch means operable by the brake pedal when the shear pin means break and adapted electrically to connect the release fasteners and the jet-pumping initiating means with a source of electrical power when operated, whereby panic-braking substantially instantaneously disables the conventional brakes, releases the pad for contact with the road and initiates evacuation of air from the air passages in the pad to force the road-contacting members against the road.

2. An emergency-stop brake for use on high speed roads for wheeled vehicles having conventional pedal-operated brakes, comprising: a pad, means normally suspending the pad under the vehicle to the rear of the rear wheels, arms hingedly connecting the pad to the vehicle at each side and securing the pad to the vehicle when the pad is lowered, the pad being spring biased downward, the pad suspending means including link members secured together by quick release means, the pad having an inverted dish-shaped housing, an air seal member secured around the border of the pad and adapted to contact the road, flat-bottomed road-contacting members secured within the housing, air passages between the flat-bottomed contacting members, an exhaust chamber secured to the housing and connected to the air passages, jet pump means operatively connected to the chamber for quickly exhausting air from the air passages, quick-acting means for initiating the pumping action of the pump means, the brake pedal being connected to the conventional brakes by link means including yieldable means adapted to yield to disable the conventional brakes when the brake pedal is depressed by a panic braking force approaching the wheel locking force adapted to lock the conventional brakes, and switch means operable by the brake pedal when the yieldable means yields, the switch means being operatively connected to both the quick release means and the jet pump quick acting initiating means, whereby panic-braking substantially instantaneously disables the conventional brakes, releases the pad for contact with the road and initiates evacuation of air from the air passages in the pad to force the road contacting members against the road.

3. The brake defined in claim 2 having a vacuum spoiler opening in the exhaust chamber and valve means associated with the spoiler opening, the valve means being operable by deceleration forces to spoil the vacuum within the pad when deceleration exceeds a selected acceptable rate.

* * * * *